US009389322B2

(12) United States Patent
Oh et al.

(10) Patent No.: US 9,389,322 B2
(45) Date of Patent: Jul. 12, 2016

(54) APPARATUS AND METHOD TO DETERMINE A POSITION OF A RADIATION SOURCE

(75) Inventors: Pil Jae Oh, Daejeon (KR); Sae Won Yoon, Daejeon (KR); Kook Jin Chun, Chungcheongnam-do (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 929 days.

(21) Appl. No.: 13/273,721

(22) Filed: Oct. 14, 2011

(65) Prior Publication Data

US 2012/0091356 A1 Apr. 19, 2012

(30) Foreign Application Priority Data

Oct. 15, 2010 (KR) ........................ 10-2010-0100617

(51) Int. Cl.
- *G01J 1/06* (2006.01)
- *G01T 7/00* (2006.01)
- *G01J 1/02* (2006.01)
- *G01J 1/04* (2006.01)
- *G01T 1/29* (2006.01)
- *G01T 1/164* (2006.01)
- *G01T 1/169* (2006.01)

(52) U.S. Cl.
CPC .................. *G01T 7/00* (2013.01); *G01J 1/0214* (2013.01); *G01J 1/0411* (2013.01); *G01T 1/169* (2013.01); *G01T 1/1648* (2013.01); *G01T 1/2907* (2013.01)

(58) Field of Classification Search
CPC ............................... G01T 1/169; G01J 1/0266
USPC ................................................ 250/336.1, 395
See application file for complete search history.

(56) References Cited

U.S. PATENT DOCUMENTS

2012/0043471 A1* 2/2012 Harpring et al. ........ G21K 1/025
250/394

FOREIGN PATENT DOCUMENTS

| KR | 100251064 | 1/2000 |
| KR | 100806072 | 10/2007 |

* cited by examiner

*Primary Examiner* — David Porta
*Assistant Examiner* — Carolyn Igyarto
(74) *Attorney, Agent, or Firm* — Allen, Dyer, Doppelt, Milbrath & Gilchrist, P.A.

(57) ABSTRACT

An apparatus for detecting a radiation source includes a collimator configured to have an optical path for converging radiation formed therein, a radiation sensor provided at the end of the optical path and configured to measure the intensity of radiation incident on the optical path, a rotation driving unit connected to the collimator and configured to rotate the collimator up and down and left and right, movement means configured to move the collimator and the rotation driving unit along the surface of land, a position tracking unit provided within the collimator and configured to track a current position and to measure a distance moved by the movement means, and a radiation position information processing unit configured to obtain direction information and information about the distance to the radiation source based on a maximum intensity of radiation, measured by the radiation sensor, and the movement distance.

9 Claims, 10 Drawing Sheets

APPARATUS AND METHOD TO DETERMINE A POSITION OF A RADIATION SOURCE

BACKGROUND OF THE INVENTION

1. Field of the Invention

The present invention relates to an apparatus for detecting a radiation source and a method of detecting a radiation source using the same and, more particularly, to an apparatus for detecting a radiation source, which is capable of rapidly obtaining information about the distance to a radiation source by using a simple construction including a position tracking unit and movement means, and a method of detecting a radiation source using the apparatus.

2. Background of the Related Art

The Chernobyl Nuclear Accident, occurred in Chernobyl of Ukraine in 1986, caused loss of numerous people and an environmental disaster, and a serious influence thereof continues. If a countermeasure technique had been developed and a countermeasure scenario had been prepared when the exposure accident of radioactivity and a state of emergency of radiation occurred before the Chernobyl Nuclear Accident, damage and influence due to the accident might have been minimized.

There is much research carried out in order to develop techniques and apparatuses for dealing with a future radioactivity emergency accident in Russia, U.S.A, Japan, etc. after the Chernobyl Nuclear Accident. Active research is being carried out in order to develop various robot systems for dealing with an emergency. The robot system for dealing with an emergency must be thrown into a radioactivity accident environment on which known information does not exist in order to detect radiation material in the unknown environment, so that the robot system can provide information for establishing a countermeasure plane for a state of emergency and efficiently processing radioactivity contaminants in an accident site. To this end, it is necessary to develop a technique and an apparatus which can rapidly detect the position of a radiation source having a high level within an accident environment.

A variety of apparatuses for detecting the position of a radiation source have been developed at home and abroad so far. Most of the apparatuses, however, provides only two dimensional (2-D) direction information about the position of a radiation source and also has disadvantages in that it is difficult to attach a movable robot owing to heavy weight and the radiation source detection speed is slow.

More particularly, as a conventional method using a gamma camera, there is a method of detecting the direction of a radiation source using a single CCD camera. If this method is used, the direction of the radiation source may be detected, but information about the distance to the radiation source is not provided. Accordingly, there are problems in that an accurate dose of a radiation source cannot be measured and an accurate position of a radiation source cannot be detected in a complicate environment.

Consequently, there are difficulties in obtaining information about an accurate direction and distance of a radiation source. If a Charge Coupled Device (CCD) camera is used in order to obtain the distance information, there are problems in that an image processing step becomes complicate, an apparatus becomes bulky, and the cost and the measurement time are increased. Accordingly, there is a need for a detection apparatus and method capable of accurately obtaining information about the direction and distance of a radiation source more rapidly using simple equipment.

SUMMARY OF THE INVENTION

The present invention has been made in view of the above problems occurring in the prior art. An embodiment of the present invention provides an apparatus and method for detecting a radiation source, which are capable of rapidly obtaining information about the distance to a radiation source by using a simple construction including a position tracking unit and movement means. Accordingly, an embodiment of the present invention provides an apparatus and method for detecting a radiation source which are capable of accurately checking information about the distance to a radiation source more rapidly by obtaining pieces of direction information about the radiation source at two or more points, while moving the position using movement means, by using only one radiation sensor and one collimator.

Further objects, specific merits and novel characteristics of the present invention will become more apparent from the following detailed description and exemplary embodiments taken in conjunction with the accompanying drawings.

To achieve the above object, an apparatus for detecting a radiation source according to an aspect of the present invention includes a collimator configured to have an optical path for converging radiation formed therein; a radiation sensor provided at the end of the optical path and configured to measure the intensity of radiation incident on the optical path; a rotation driving unit connected to the collimator and configured to rotate the collimator up and down and left and right; movement means configured to move the collimator and the rotation driving unit along the surface of land; a position tracking unit provided within the collimator and configured to track a current position and to measure a distance moved by the movement means; and a radiation position information processing unit configured to obtain direction information and information about a distance to the radiation source based on a maximum intensity of radiation, measured by the radiation sensor, and the movement distance.

The radiation position information processing unit measures a longitude angle and a latitude angle to the radiation source based on the maximum intensity of radiation measured by the radiation sensor and measures a distance to the radiation source based on the longitude angle, the latitude angle, and the movement distance.

The rotation driving unit may comprise pan and tilt means for panning and tilting the collimator.

The apparatus may further comprise a rotation driving control unit for adjusting a panning angle, a tilting angle, and a speed of revolution by controlling the pan and tilt means.

The radiation position information processing unit measures the longitude angle based on direction information, having the maximum intensity of radiation measured by the radiation sensor, while the pan and tilt means pans the collimator and measures the latitude angle based on direction information, having the maximum intensity of radiation measured by the radiation sensor, while the pan and tilt means tilts the collimator.

The rotation driving unit may comprise a first rotation driving unit coupled to the collimator and configured to rotate the collimator around a first axis which is parallel to the surface of land, but vertical to the length direction of the optical path and a second rotation driving unit configured to rotate the collimator and the first rotation driving unit around a second axis which is parallel to the surface of land, but vertical to the first axis.

The apparatus may further comprise a rotation driving control unit for adjusting the speed of revolution of the first rotation driving unit and for rotating the collimator by 360° around the vertical axis by driving the first rotation driving unit, in the state in which the collimator has been rotated by 360° around the first axis by driving the first rotation driving unit and then the first rotation driving unit and the collimator have been rotated by 90° by driving the second rotation driving unit.

The radiation position information processing unit measures the latitude angle to the radiation source based on a maximum intensity of radiation, measured by the radiation sensor, while the collimator is rotated by 360° around the first axis and measures the longitude angle to the radiation source based on a maximum intensity of radiation, measured by the radiation sensor, while the collimator is rotated by 360° around the vertical axis.

The position tracking unit is formed of a Global Positioning System (GPS) or a gyroscope and configured to measure the movement distance.

An apparatus for detecting a radiation source according to another aspect of the present invention comprises two radiation direction detection units, each configured to comprise a collimator configured to have an optical path for converging radiation formed therein, a radiation sensor provided at the end of the optical path and configured to measure the intensity of radiation incident on the optical path, and a rotation driving unit connected to the collimator and configured to rotate the collimator up and down and left and right; a stage configured to have the two radiation direction detection units spaced apart from each other at a specific interval; and a radiation position information processing unit configured to measure information about the distance to the radiation source based on the interval and a maximum intensity of radiation measured by the radiation sensor provided in the radiation direction detection unit.

The rotation driving unit provided in the radiation direction detection unit may comprise pan and tilt means for panning and tilting the collimator. The radiation position information processing unit measures a longitude angle based on direction information, having a maximum intensity of radiation measured by the radiation sensor, while the rotation driving unit is panned, measures a latitude angle based on direction information, having a maximum intensity of radiation measured by the radiation sensor, while the rotation driving unit is tilted, and measures a distance to the radiation source based on the latitude angle and the longitude angle and the interval.

The rotation driving unit provided in the radiation direction detection unit may comprise a first rotation driving unit coupled to the collimator and configured to rotate the collimator around a first axis which is parallel to the surface of land, but vertical to a length direction of the optical path and a second rotation driving unit configured to rotate the collimator and the first rotation driving unit around a second axis which is parallel to the surface of land, but vertical to the first axis.

The apparatus may further comprise a rotation driving control unit for adjusting the speed of revolution of the first rotation driving unit and for rotating the collimator by 360° around the vertical axis by driving the first rotation driving unit, in the state in which the collimator has been rotated by 360° around the first axis by driving the first rotation driving unit and then the first rotation driving unit and the collimator have been rotated by 90° by driving the second rotation driving unit.

The radiation position information processing unit measures the latitude angle based on a maximum intensity of radiation, measured by the radiation sensor, while the collimator is rotated by 360° around the first axis and measures the longitude angle based on a maximum intensity of radiation, measured by the radiation sensor, while the collimator is rotated by 360° around the vertical axis.

The optical path has a pinhole type which is gradually widened from the radiation sensor to an opening portion and has a width greater than a height.

A method of detecting a radiation source using the apparatus for detecting a radiation source according to yet another aspect of the present invention comprises the steps of a position tracking unit obtaining position information about a collimator having a radiation sensor disposed therein; the radiation sensor measuring the intensity of radiation which is converged through an optical path of the collimator, while a rotation driving unit rotates the collimator up and down and left and right; a radiation position information processing unit extracting a maximum value from the measured intensity of radiation and obtaining direction information about the radiation source; movement means moving the collimator by a specific movement distance and the position tracking unit measuring a movement distance; after the movement, repeating the step of measuring the intensity of radiation and the step of obtaining the direction information; and a radiation position information processing unit obtaining information about a distance to the radiation source based on the direction information and the movement distance.

A method of detecting a radiation source using an apparatus for detecting a radiation source according to further yet another aspect of the present invention comprises the steps of a position tracking unit obtaining a position of a collimator having a radiation sensor disposed therein; while pan and tilt means pans the collimator by 360° at a specific speed, a radiation sensor, provided at the end of an optical path of the collimator, measuring the intensity of radiation which is converged on the optical path; a radiation position information processing unit measuring a longitude angle to the radiation source based on a direction having a maximum intensity of radiation, in the intensity of radiation measured by the radiation sensor; while the pan and tilt means tilts the collimator at a specific speed, the radiation sensor, provided at the end of the optical path of the collimator, measuring the intensity of radiation which is converged on the optical path, and the radiation position information processing unit measuring a latitude angle to the radiation source based on a direction having a maximum intensity of radiation in the intensity of radiation which has been measured by the radiation sensor, thereby obtaining direction information about the radiation source; movement means moving the collimator, and the position tracking unit measuring a movement distance; after the movement, repeating the steps of measuring the intensity of radiation, the step of measuring the longitude angle, and the step of obtaining the direction information; and the radiation position information processing unit obtaining information about a distance to the radiation source based on the longitude angle, the latitude angle, and the movement distance.

The method may further comprise the step of a rotation control unit adjusting a panning angle, a tilting angle, and a speed of revolution by controlling the pan and tilt means.

A method of detecting a radiation source using an apparatus for detecting a radiation source according to still yet another aspect of the present invention comprises the steps of a position tracking unit obtaining information about the position of a collimator having a radiation sensor disposed therein; while a first rotation driving unit rotating a collimator by 360° around a first axis at a specific speed, a radiation sensor, provided at the end of the optical path of the collimator, measuring the intensity of radiation converged on the optical path, and a radiation position information processing unit measuring a latitude angle to the radiation source based on a direction having a maximum intensity of radiation in the intensity of radiation measured by the radiation sensor; while the first rotation driving unit rotates the collimator by 360° around the vertical axis after a second rotation driving unit rotates the collimator and the first rotation driving unit by 90° around a second axis, the radiation sensor, provided at the end of the optical path of the collimator, measuring the intensity of radiation converged on the optical path, and a radiation position information processing unit measuring a longitude angle to the radiation source based on a direction having a maximum intensity of radiation in the intensity of radiation measured by the radiation sensor, thereby obtaining direction information about the radiation source; movement means moving the collimator and a position tracking unit measuring a movement distance; after the movement, repeating the step of measuring the latitude angle and the step of obtaining the direction information; and the radiation position information processing unit measuring a distance to the radiation source based on the longitude angle, the latitude angle, and the movement distance.

The method may further comprise the step of, in the state in which the rotation driving control unit has rotated the collimator by 360° around the first axis by driving the first rotation driving unit and then has rotated the first rotation driving unit and the collimator by 90° by driving the second rotation driving unit, the rotation driving control rotating the collimator by 360° around the vertical axis by driving the first rotation driving unit.

A method of detecting a radiation source using an apparatus for detecting a radiation source according to further yet another aspect of the present invention comprises the steps of a rotation driving unit rotating each of two radiation direction detection units up and down and left and right; while the radiation direction detection unit is rotated, each of the radiation direction detection units measuring a direction of a radiation source; and a radiation position information processing unit measuring a distance to the radiation source based on the direction of the radiation source, measured by each of the radiation direction detection units, and an interval between the radiation direction detection units.

In the step of the rotation driving unit rotating each of two radiation direction detection units and the step of each of the radiation direction detection units measuring a direction of a radiation source, a rotation control unit controls the rotation driving unit so that each of the radiation direction detection units is panned to measure a longitude angle to the radiation source and each of the radiation direction detection units is tilted to measure a latitude angle to the radiation source, and the radiation position information processing unit measures a distance to the radiation source based on the longitude angle, the latitude angle, and the interval.

The step of a rotation driving unit rotating each of two radiation direction detection units and the step of each of the radiation direction detection units measuring a direction of a radiation source comprises the steps of a rotation driving control unit rotating the radiation direction detection unit by 360° around a first axis by driving a first rotation driving unit provided in each of the radiation direction detection units; while the radiation direction detection unit is rotated by 360° around the first axis, the radiation position information processing unit measuring a latitude angle to the radiation source; the rotation driving control unit rotating the radiation direction detection unit and the first rotation driving unit by 90° around a second axis by driving a second rotation driving unit provided in each of the radiation direction detection units; the rotation driving control unit rotating the radiation direction detection unit by 360° around the first axis by driving the first rotation driving unit; and while the radiation direction detection unit is rotated around the first axis, the radiation position information processing unit measuring a longitude angle to the radiation source. The radiation position information processing unit measuring a distance to the radiation source based on the longitude angle, the latitude angle, and the interval.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Figure 1:
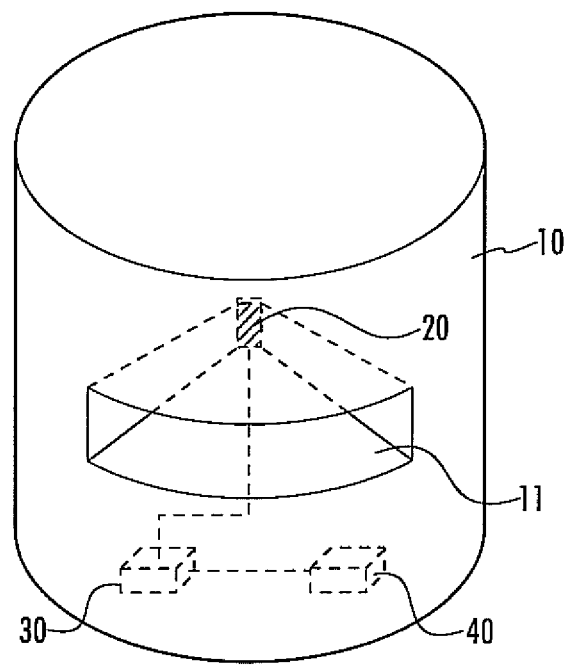
FIG. 1 is a perspective view seen from the front of a collimator in which a radiation sensor is disposed according to a first embodiment of the present invention.

Hereinafter, preferred embodiments of the present invention are described in detail with reference to the accompanying drawings in order for those skilled in the art to be able to readily practice them. In describing the operational principle relating to the preferred embodiments of the present invention, when a detailed description of relevant functions or constructions is determined to make unnecessarily obscure the subject matter of the present invention, the detailed description will be omitted.

Furthermore, the same reference numerals designate elements having similar functions and operations throughout the drawings. Throughout the specification, when it is described that one element is 'connected' to the other element, the one element may be 'directly connected' to the other element or 'indirectly connected' to the other element through a third element. Furthermore, when it is described that one element 'includes (or comprises)' another element, it means that the one element does not exclude another element, but may include other elements, unless otherwise described.

Construction of an Apparatus for Detecting a
Radiation Source and a Method of Detecting a
Radiation Source According to a First Embodiment Hereinafter, the construction of the apparatus for detecting a radiation source (hereinafter referred to as the 'radiation source detection apparatus' according to the first embodiment of the present invention is described. The radiation source detection apparatus 100 according to the first embodiment of the present invention includes a collimator 10 having an optical path 11 formed therein, a radiation sensor 20, a rotation driving unit, a rotation driving control unit, a position tracking unit 40, and movement means 80.

Figure 2:
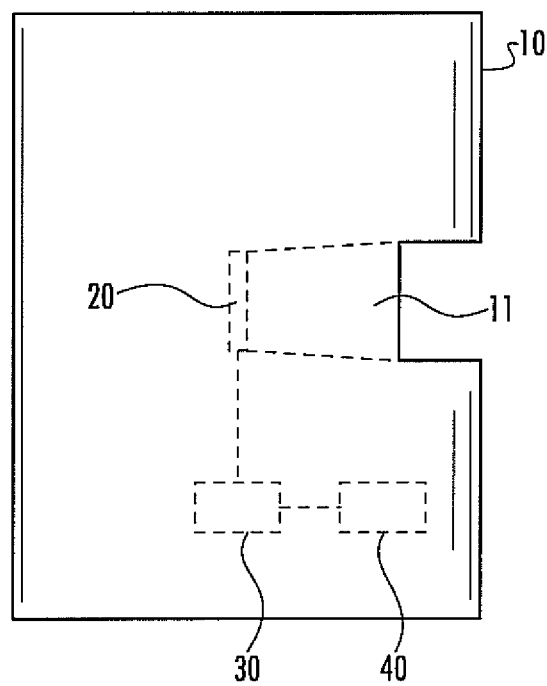
FIG. 2 is a side view of the collimator in which a radiation sensor is disposed according to the first embodiment of the present invention.

First, FIG. 1 is a perspective view seen from the front of the collimator 10 in which the radiation sensor 20 is disposed according to the first embodiment of the present invention. Furthermore, FIG. 2 is a side view of the collimator 10 in which the radiation sensor 20 is disposed according to the first embodiment of the present invention. As shown in FIGS. 1 and 2, the collimator 10 is equipped with the optical path 11 therein, and the radiation sensor 20 is disposed at the end of the optical path 11.

As shown in FIGS. 1 and 2, the optical path 11 according to an embodiment of the present invention has a shape which is widened from the position where the radiation sensor 20 is placed to an opening portion so that convergence on radiation is facilitated. Furthermore, the opening portion has a horizontal length longer than a vertical length. It is, however, evident that all the shapes for converging radiation are included in the scope of the present invention within a range that a person having ordinary skill in the art can easily modify the shapes.

The radiation sensor 20 provided at the end of the optical path 11 measures the intensity of radiation which is converged through the optical path 11. The radiation source detection apparatus 100 according to the embodiment of the present invention further includes the rotation driving unit for rotating the collimator 10. The rotation driving unit rotates the collimator 10 up and down and left and right. In other words, the rotation driving unit is formed of pan and tilt means and is configured to rotate the collimator 10 left and right by panning the collimator 10 and to rotate up and down the collimator 10 by tilting the collimator 10.

The radiation source detection apparatus including the rotation driving unit according to a detailed embodiment is described below. It is evident that all the elements for rotating the collimator 10 in order to detect the direction of a radiation source, in addition to the rotation driving unit, are included in the scope of the present invention within a range that a person having ordinary skill in the art can easily modify the elements.

Figure 3A:
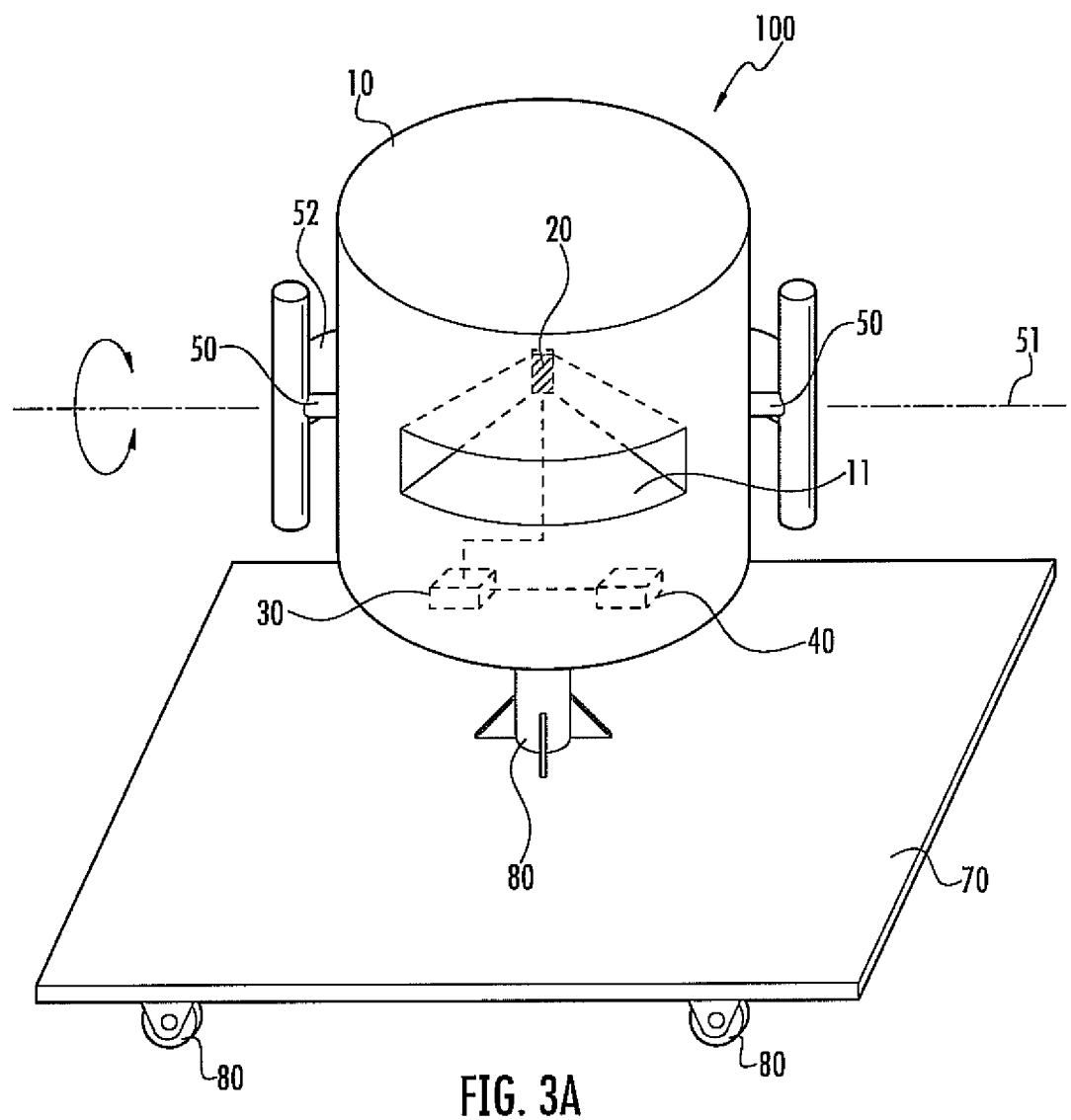
FIG. 3A is a perspective view seen from the front of an apparatus for detecting a radiation source according to a first embodiment of the present invention.
Figure 3B:
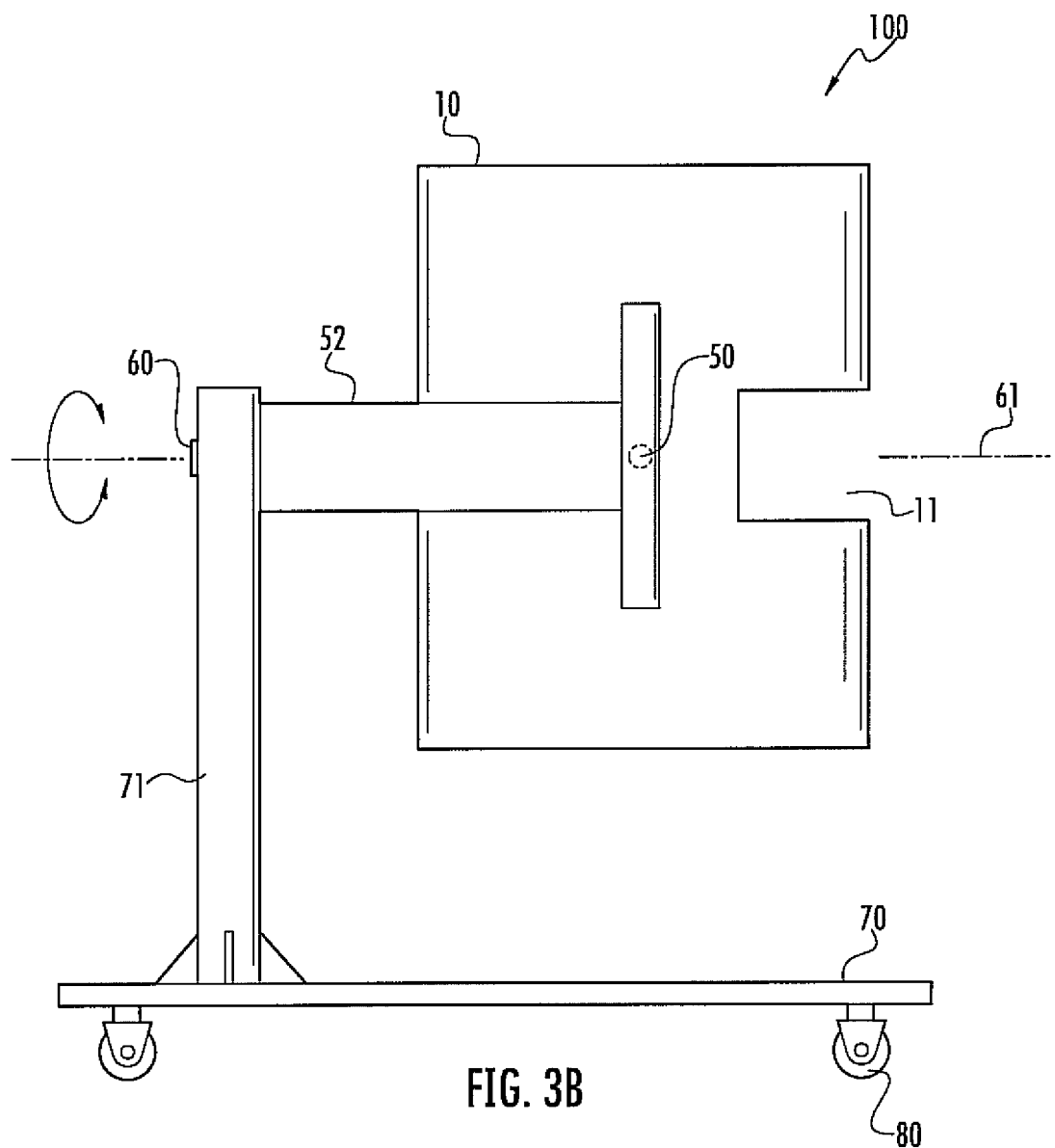
FIG. 3B is a side view of the apparatus for detecting a radiation source according to the first embodiment of the present invention.

FIG. 3A is a perspective view seen from the front of the radiation source detection apparatus 100 according to the first embodiment of the present invention. Furthermore, FIG. 3B is a side view of the radiation source detection apparatus 100 according to the first embodiment of the present invention. As shown in FIGS. 3A and 3B, the rotation driving unit is formed of a first rotation driving unit 50 and a second rotation driving unit 60. The first rotation driving unit 50 rotates the collimator 10 by 360° around a first axis 51 which is parallel to the surface of land 2 and vertical to the length direction axis of the optical path 11 on the basis of FIG. 3A. While the collimator 10 is rotated by 360° by the first rotation driving unit 50, the radiation sensor 20 measures the intensity of radiation which is converged on the optical path 11 from the outside, and a radiation position information processing unit 30 obtains information about a latitude angle to the radiation source on the basis of a maximum intensity of radiation. This process will be described in detail a method of detecting a radiation source which will be described later.

From FIG. 3B, it can be seen that the second rotation driving unit 60 is connected to one side of the center of a connection member 52 that connects the first rotation driving unit 50. The second rotation driving unit 60 rotates the collimator 10 around a second axis 61 which is parallel to the surface of land 2, but vertical to the first axis 51. Accordingly, the rotation driving unit according to the embodiment of the present invention can move the collimator 10 in two axes.

Figure 4:
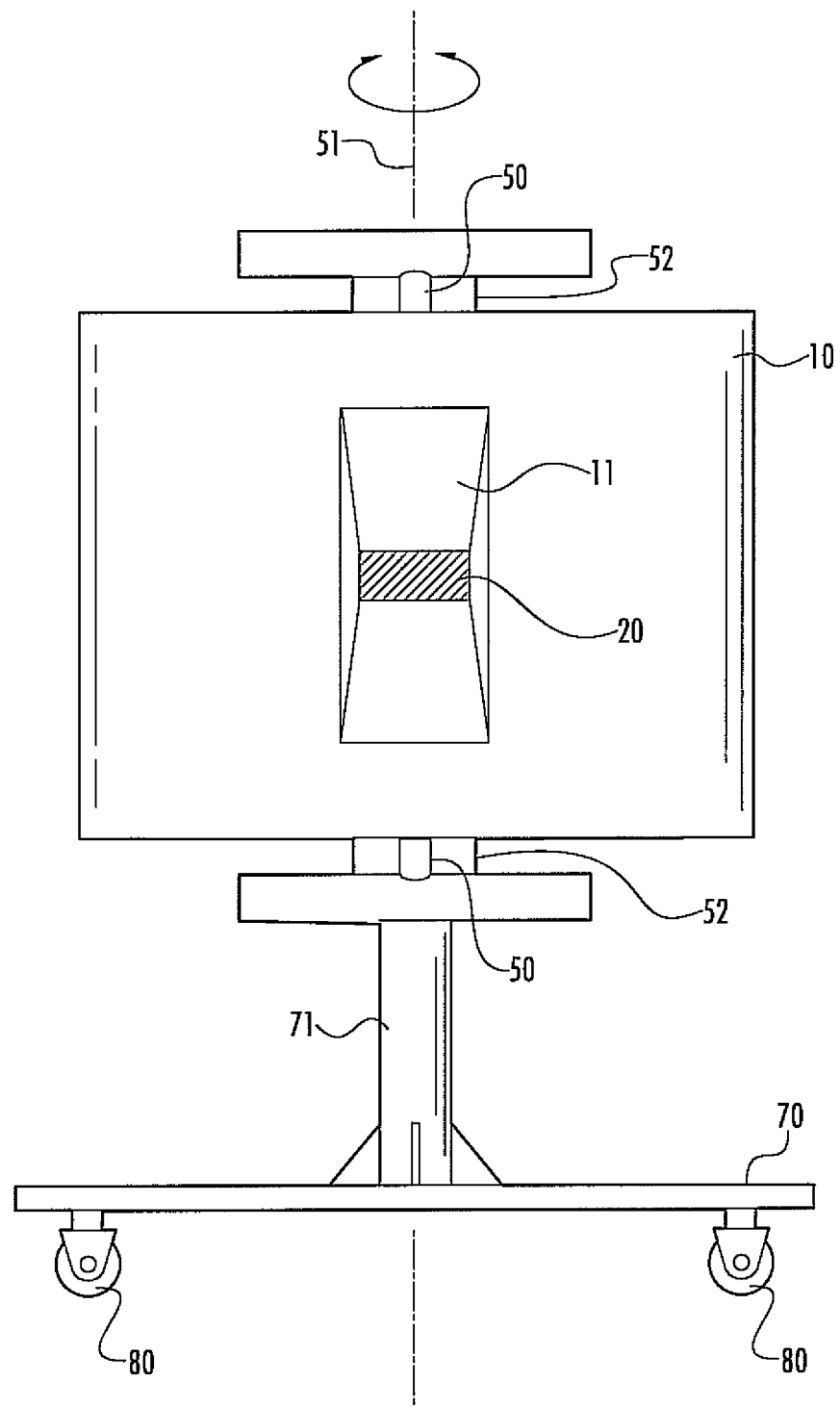
FIG. 4 is a front view of the apparatus for detecting a radiation source having the collimator rotated by 90° by means of a second rotation driving unit according to the first embodiment of the present invention.

FIG. 4 is a front view of the radiation source detection apparatus 100 having the collimator 10 rotated by 90° by means of the second rotation driving unit 60 according to the first embodiment of the present invention. From FIG. 4, it can be seen that the collimator 10 has been rotated by 90° around the second axis 61 by means of the second rotation driving unit 60. The first rotation driving unit 50 and the second rotation driving unit 60 can be independently driven. Accordingly, the first rotation driving unit 50 may be driven to rotate the collimator by 360° in the state in which the collimator 10 has been rotated by 90° around the second axis 61. The rotation of the collimator 10 by the second rotation driving unit 60 also enables the first rotation driving unit 50 to be rotated, thereby rotating the first axis 51 of the first rotation driving unit 50 by 90°. Accordingly, the first axis 51 is equal to the vertical axis in the state in which it has been rotated by 90° around the second axis 61.

While the first rotation driving unit 50 rotates the collimator 10 by 360° with the collimator 10 rotated by 90°, the radiation sensor 20 measures the intensity of radiation which is converged on the optical path 11 from the outside, and the radiation position information processing unit 30 obtains information about the longitude angle to the radiation source on the basis of a maximum intensity of radiation. This process will be described in detail below in a method of detecting a radiation source.

The radiation source detection apparatus 100 according to the first embodiment of the present invention may further include the rotation driving control unit (not shown). The rotation driving control unit may control the angle and the speed of revolution by controlling the first rotation driving unit 50 and the second rotation driving unit 60. In the embodiment of the present invention, the rotation driving control unit controls the first rotation driving unit 50 so that the angle is increased within a range of 0.1 to 1 per second upon scanning.

The radiation source detection apparatus 100 according to the first embodiment of the present invention may further include the movement means 80. In a detailed embodiment, the second rotation driving unit 60 and the stage 70 are coupled by a support column 71. The movement means 80 provided at the bottom of the stage 70 moves all the stage 70, the first rotation driving unit 50, the second rotation driving unit 60, and the collimator 10 along the surface of land 2. The movement means 80 may be formed of a wheel rotatable by 360°, a cutter filter, and so on. The radiation source detection apparatus 100 according to the first embodiment of the present invention further includes the position tracking unit 40.

The position tracking unit 40 is provided within the collimator 10 and may be formed of a Global Position System (GPS), a gyroscope, or the like. The position tracking unit 40 checks a current position of the collimator 10, checks the position after movement if the radiation source detection apparatus 100 has been moved by the movement means 80, and measures a movement distance d. Furthermore, the position tracking unit 40 transmits information about the measured movement distance d to the radiation position information processing unit 30.

Figure 5:
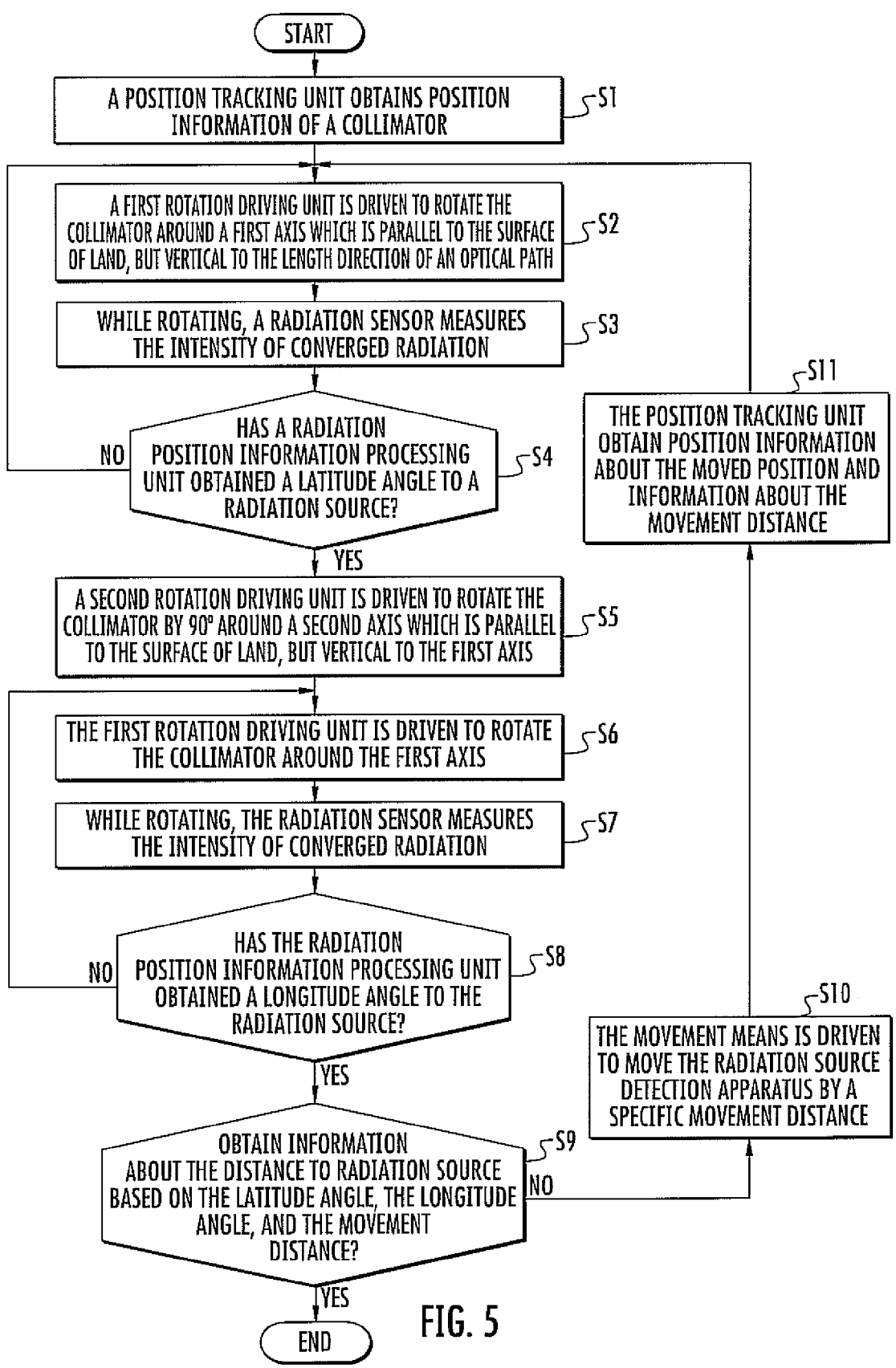
FIG. 5 a flowchart illustrating a method of detecting a radiation source according to a first embodiment of the present invention.

A method of detecting a radiation source according to a first embodiment of the present invention is described in detail. The method of detecting a radiation source according to the first embodiment of the present invention is performed by using the radiation source detection apparatus 100 according to the first embodiment of the present invention. First, FIG. 5 a flowchart illustrating the method of detecting a radiation source according to the first embodiment of the present invention. As shown in FIG. 5, the position tracking unit 40 embedded in the radiation source detection apparatus 100 obtains information about a current position (i.e., information about a position at a first point) of the radiation source detection apparatus 100 at step S1.

Next, the rotation driving control unit drives the first rotation driving unit 50. When the first rotation driving unit 50 is driven, the collimator 10 is rotated by 360° around the first axis 51 which is parallel to the surface of land 2, but vertical to the length direction of the optical path 11 at step S2. While the collimator 10 is rotated around the first axis 51, the radiation sensor 20 performs scanning. In other words, the radiation sensor 20 provided at the end of the optical path 11 measures the intensity of radiation which is converged on the optical path 11 at step S3. Furthermore, the radiation sensor 20 transmits information about the intensity of radiation, measured according to the direction, to the radiation position information processing unit 30 in real time.

The radiation position information processing unit 30 checks a direction where the intensity of radiation measured by the radiation sensor 20 is a maximum as a direction where the radiation source is placed and obtains information about a latitude angle to the radiation source detection apparatus 100 and the radiation source at step S4. Furthermore, the rotation driving control unit drives the second rotation driving unit 60. When the second rotation driving unit 60 is driven, both the collimator 10 and the first rotation driving unit 50 are rotated by 90° around the second axis 61 at step S5. As described above, when the second rotation driving unit 60 is driven, not only the collimator 10, but also the first rotation driving unit 50 is rotated, so that the direction of the first axis 51 is changed.

Furthermore, the rotation driving control unit drives the first rotation driving unit 50 again. When the first rotation driving unit 50 is driven, the collimator 10 is rotated by 360° around the first axis 51 (i.e., the vertical axis) at step S6. While the collimator 10 is rotated, the radiation sensor 20 performs scanning. That is, the radiation sensor 20 provided at the end of the optical path 11 measures the intensity of radiation which is converged on the optical path 11 at step S7. Furthermore, the radiation sensor 20 transmits information about the intensity of radiation, measured according to the direction, to the radiation position information processing unit 30 in real time.

The radiation position information processing unit 30 checks a direction where the intensity of radiation measured by the radiation sensor 20 is a maximum as a direction where the radiation source is placed and obtains information about a longitude angle to the radiation source detection apparatus 100 and the radiation source at step S8. Accordingly, information about the direction is obtained between the position of the radiation source detection apparatus 100 and the position of the radiation source. The direction information can be obtained based on the longitude angle and the latitude angle of the radiation source which are obtained by the two-step scanning tasks.

Next, the radiation position information processing unit 30 checks whether information about the distance to the radiation source can be obtained at step S9. Information about the distance to the radiation source cannot be checked by using direction information at one point. In order to obtain the information about the distance to the radiation source, pieces of direction information at two or more points are required. If the information about the distance to the radiation source is not obtained, the movement means 80 is driven to move the radiation source detection apparatus 100 by a specific movement distance d (e.g., 10 m) at step S10. After the movement, the position tracking unit 40 obtains position information about the moved position, measures the moved movement distance d, and transmits information about the position information and information about the movement distance d to the radiation position information processing unit 30.

After the movement, the above-described steps S2, S3, S4, S5, S6, S7, and S8 are repeatedly performed. Accordingly, direction information about the radiation source is obtained at the moved position (i.e., a second point). The direction information, as described above, is obtained based on the longitude angle and the latitude angle through the two-step scanning processes. Furthermore, the radiation position information processing unit 30 obtains information about the distance to the radiation source because it has obtained the direction information about the radiation source at the second point and the movement distance d.

Figure 6:
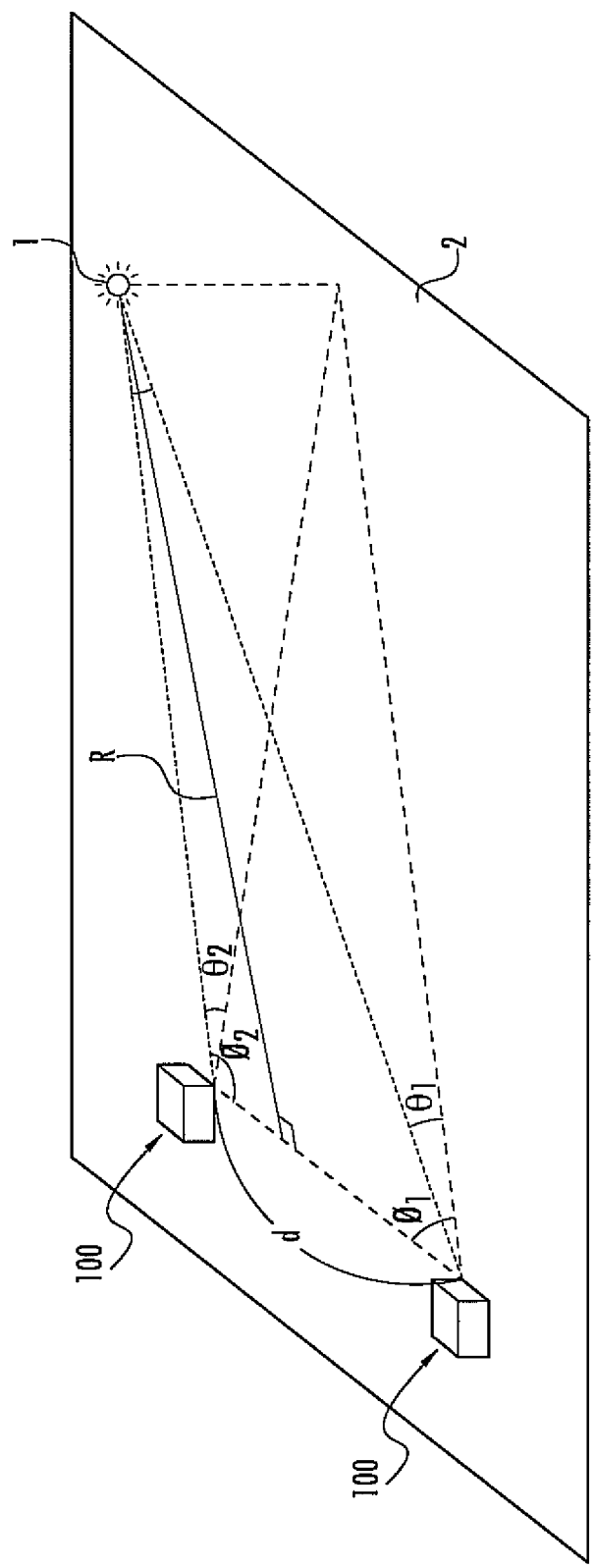
FIG. 6 is a diagram illustrating a method of extracting the distance to a radiation source according to a first embodiment of the present invention.

FIG. 6 is a diagram illustrating a method of extracting the distance to a radiation source according to a first embodiment of the present invention. As shown in FIG. 6, the radiation position information processing unit 30 checks the distance to the radiation source using a trigonometric function method because it has obtained the latitude angle $\Theta_1$ and the longitude angle $\Phi_1$ (i.e., the pieces of direction information from the first point to the radiation source) of the radiation source to the first point, the latitude angle $\Theta_2$ and the longitude angle $\Phi_2$ (i.e., the pieces of direction information from the second point to the radiation source) of the radiation source to the second point, and the movement distance d.

Figure 7A:
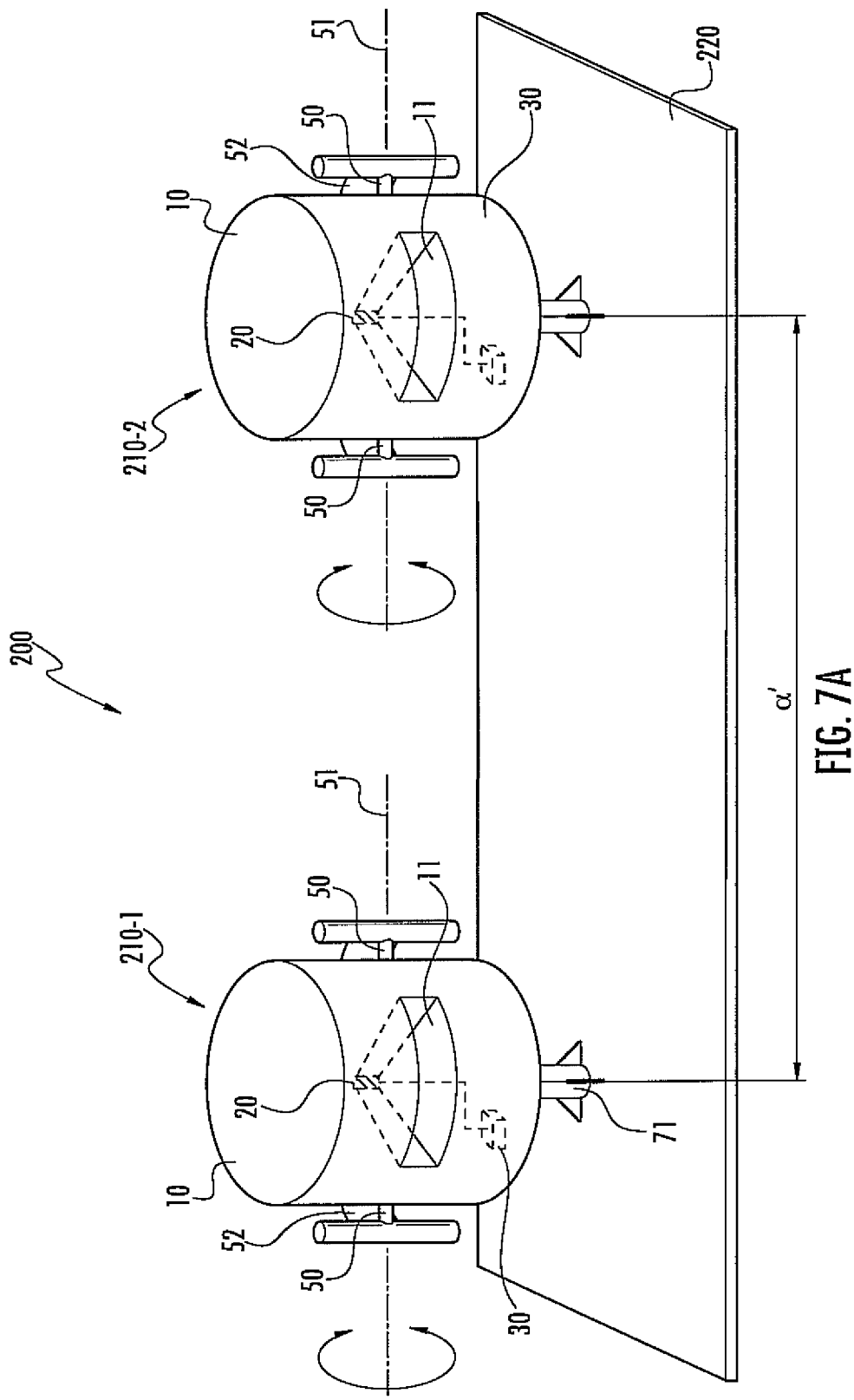
FIG. 7A is a perspective view seen from the front of an apparatus for detecting a radiation source according to a second embodiment of the present invention.

Construction of a Radiation Source Detection Apparatus and a Method of Detecting a Radiation Source According to a Second Embodiment Hereinafter, the construction of the radiation source detection apparatus 200 and the method of detecting a radiation source according to the second embodiment of the present invention are described. Differences from the first embodiment will be chiefly described. First, FIG. 7A is a perspective view seen from the front of the radiation source detection apparatus 200 according to the second embodiment of the present invention. As shown in FIG. 7A, in the second embodiment of the present invention, movement means 80 and the position tracking unit 40 are not provided unlike in the first embodiment.

The radiation source detection apparatus 200 according to the second embodiment includes two radiation direction detection units (i.e., a first radiation direction detection unit 210-1 and a second radiation direction detection unit 210-2) in one support plate 220. Each of the first radiation direction detection unit 210-1 and the second radiation direction detection unit 210-2 includes a collimator 10, a radiation sensor 20, a rotation driving unit, and a radiation position information processing unit 30. The collimator 10, the radiation sensor 20, and the rotation driving unit of each radiation direction detection unit have the same constructions as those of the first embodiment.

The two radiation direction detection units 210-1 and 210-2 installed in the support plate according to the second embodiment of the present invention includes respective rotation driving units. Accordingly, the two radiation direction detection units 210-1 and 210-2 can be independently driven in two axes by means of first rotation driving units 50, respectively, and second rotation driving units 60, respectively. Thus, each of the two radiation direction detection units installed in the one support plate obtains direction information about a radiation source. Furthermore, information about the distance to the radiation source is obtained based on the two pieces of direction information about the radiation source and an interval between the radiation direction detection units.

Figure 7B:
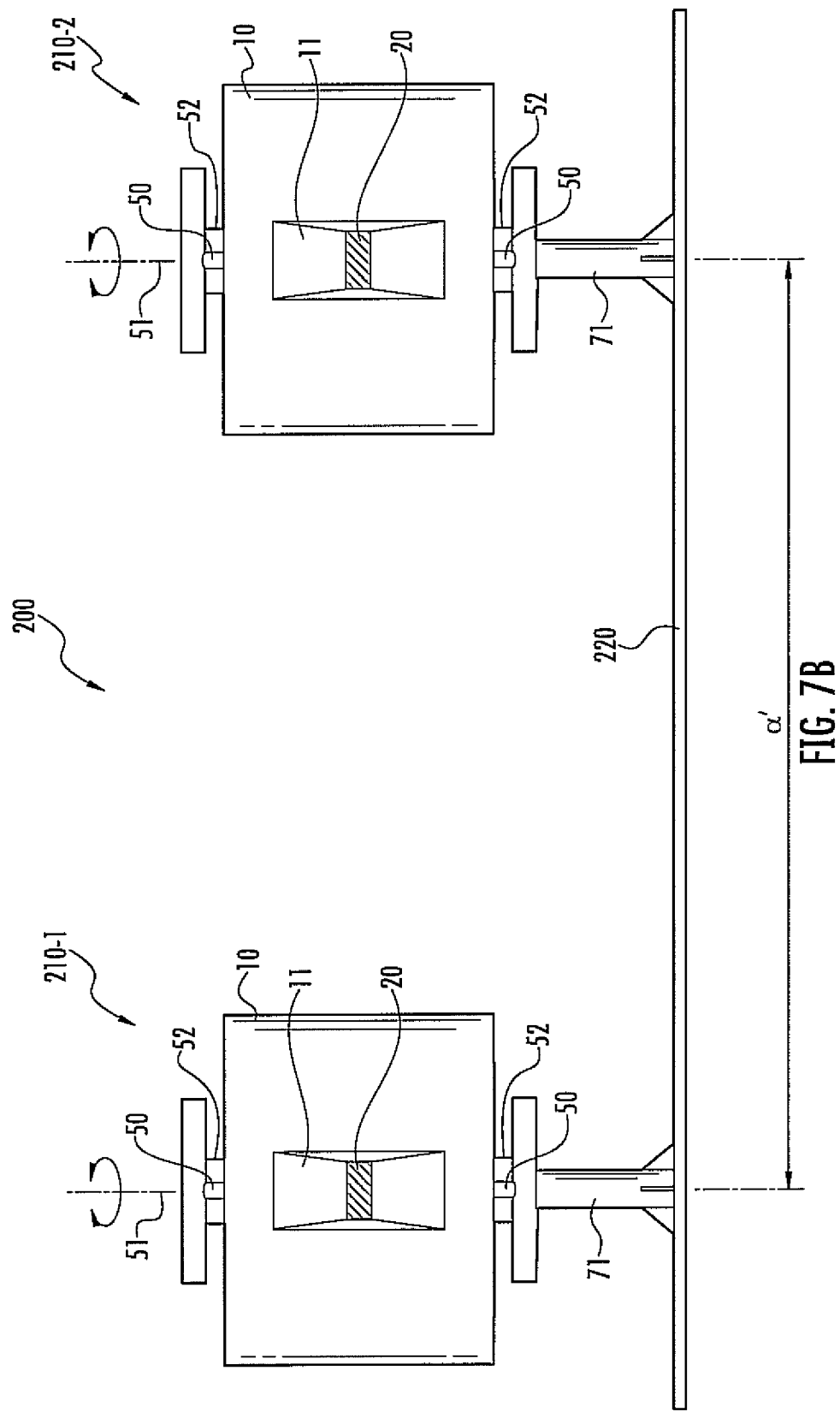
FIG. 7B is a front view of the apparatus for detecting a radiation source according to the second embodiment of the present invention in which the collimator and the first rotation driving unit of each of radiation direction detection units have been rotated by 90° around a second axis by means of the second rotation driving unit.
Figure 8:
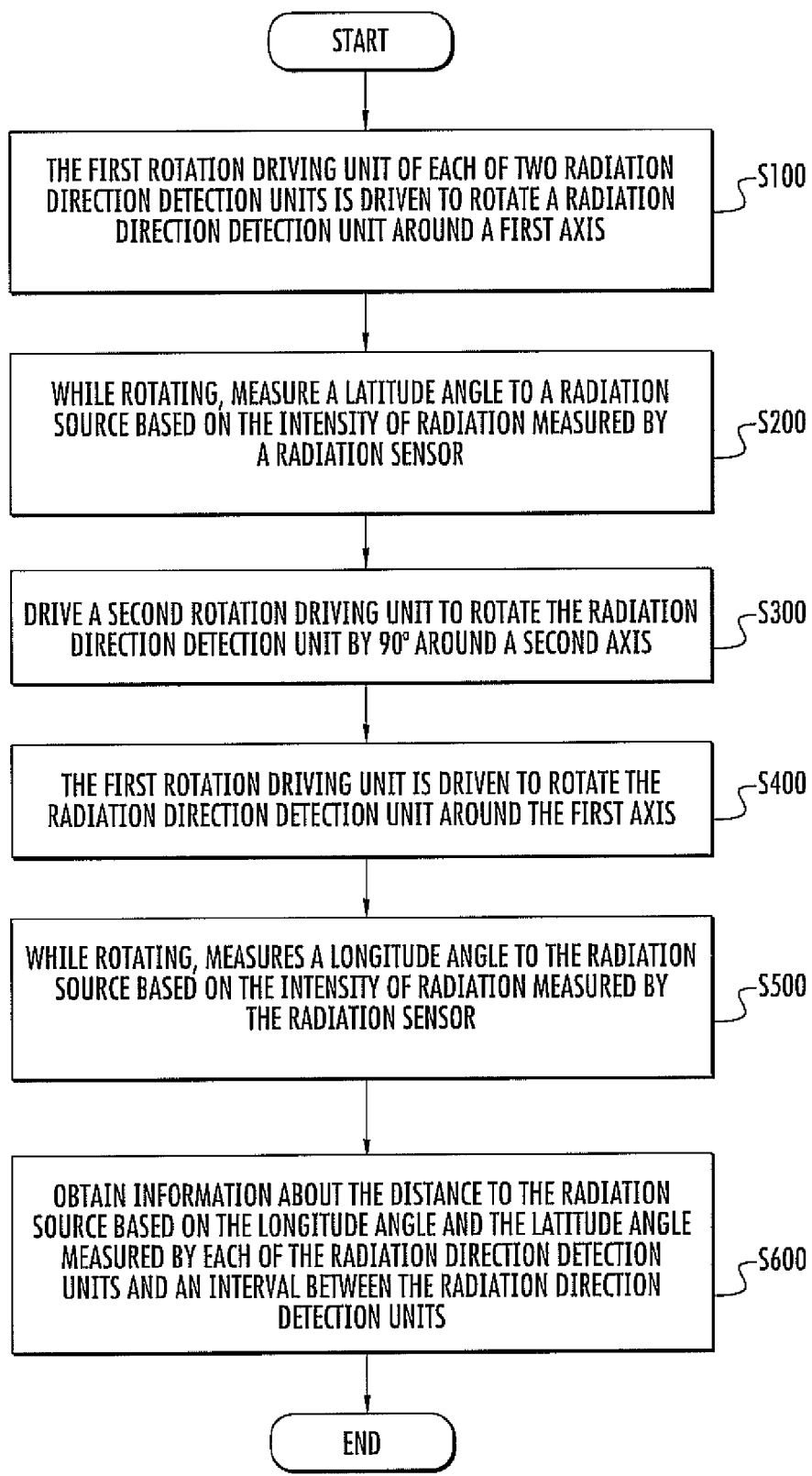
FIG. 8 is a flowchart illustrating a method of detecting a radiation source according to a second embodiment of the present invention.

FIG. 7B is a front view of the radiation source detection apparatus according to the second embodiment of the present invention in which the collimator 10 and the first rotation driving unit 50 of each of the radiation direction detection units have been rotated by 90° around a second axis 61 by means of the second rotation driving unit 60. The method of detecting a radiation source according to the second embodiment of the present invention is described below. FIG. 8 is a flowchart illustrating the method of detecting a radiation source according to the second embodiment of the present invention.

Each of the two radiation direction detection units 210-1 and 210-2 obtains direction information about a radiation source. A method of obtaining the direction information about the radiation source is the same as that of the first embodiment described above. In other words, the rotation driving control unit of each of the radiation direction detection units 210-1 and 210-2 drives the first rotation driving unit 50 so that the collimator 10 is rotated by 360° around a first axis 51 at step S100. While the collimator 10 is rotated, the radiation sensor performs scanning, and the radiation position information processing unit 30 extracts information about a latitude angle to the radiation source on the basis of the intensity of radiation and a maximum intensity of radiation which are measured at step S200. Accordingly, a latitude angle $\Theta_1$ measured by the first radiation direction detection unit 210-1 and a latitude angle $\Theta_2$ measured by the second radiation direction detection unit 210-2 are obtained.

Next, the rotation driving control unit of each of the radiation direction detection units 210-1 and 210-2 drives the second rotation driving unit 60 so that the collimator 10 and the first rotation driving unit 50 are rotated by 90° around the second axis 61 at step S300. Next, in the state in which the collimator 10 and the first rotation driving unit 50 are rotated by 90°, the first rotation driving unit 50 is driven so that the collimator 10 is rotated by 360° around the vertical axis (i.e., the second axis 61) at step S400. While the collimator 10 is rotated, the radiation sensor 20 performs scanning, and the radiation position information processing unit 30 extracts information about a longitude angle to the radiation source on the basis of the intensity of radiation and a maximum intensity of radiation which are measured at step S500. Accordingly, a latitude angle $\Phi_1$ measured by the first radiation direction detection unit 210-1 and a latitude angle $\Phi_2$ measured by the second radiation direction detection unit 210-2 are obtained.

The first radiation direction detection unit 210-1 and the second radiation direction detection unit 210-2 are independently driven, and they do not need to be driven at the same time. Information about the distance to the radiation source is obtained on the basis of the pieces of direction information (i.e., the longitude angle $\Phi_1$ and the latitude angle $\Theta_1$) of the radiation source which have been obtained by the first radiation direction detection unit 210-1, the pieces of direction information (i.e., the longitude angle $\Phi_2$ and the latitude angle $\Theta_2$) of the radiation source which have been obtained by the second radiation direction detection unit 210-2, and an interval d' between the first radiation direction detection unit 210-1 and the second radiation direction detection unit 210-2 at step S600.

Figure 9:
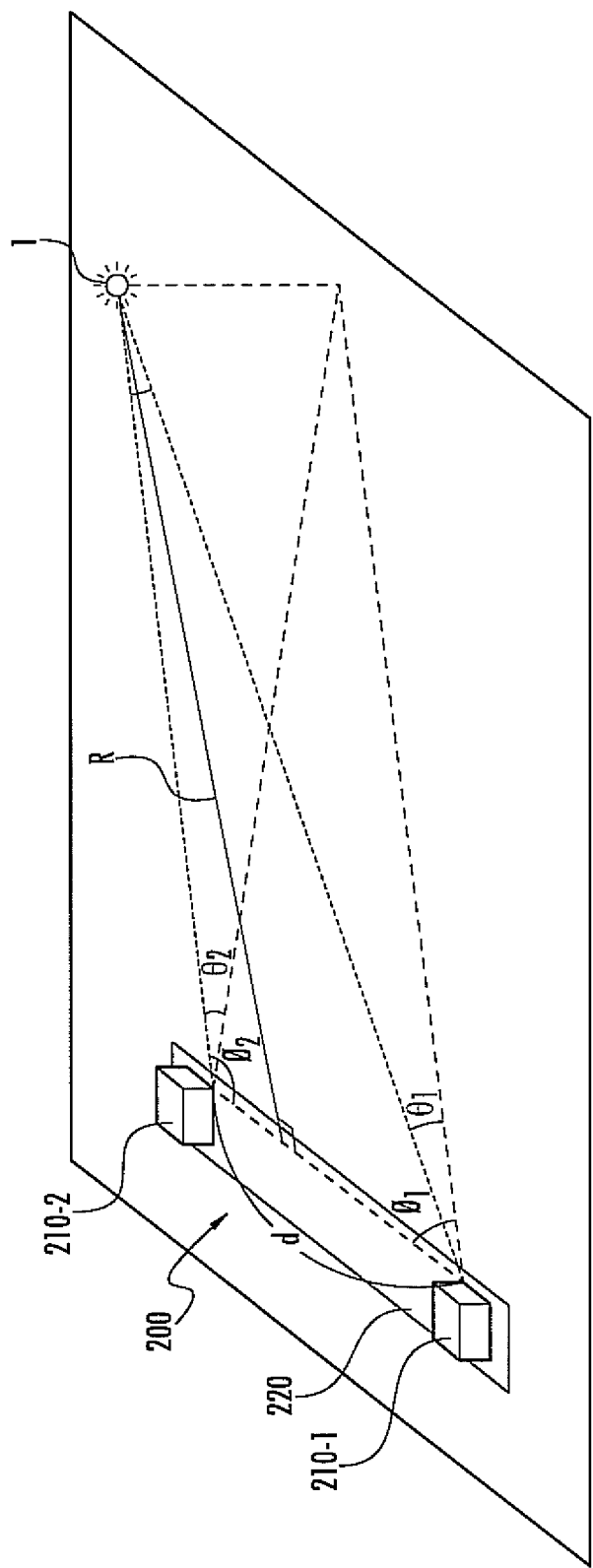
FIG. 9 is a diagram illustrating a method of extracting the distance to a radiation source according to a second embodiment of the present invention.

FIG. 9 is a diagram illustrating a method of extracting the distance to a radiation source according to a second embodiment of the present invention. As shown in FIG. 9, the radiation position information processing unit 30 checks a distance R to the radiation source using a trigonometric function method because the first radiation direction detection unit 210-1 knows the latitude angle $\Theta_1$ and the longitude angle $\Phi_1$ of the radiation source (i.e., the pieces of direction information to the radiation source), the second radiation direction detection unit 210-2 knows the latitude angle $\Theta_2$ and the longitude angle $\Phi_2$ of the radiation source (i.e., the pieces of direction information to the radiation source), and the interval d' between the first radiation direction detection unit 210-1 and the second radiation direction detection unit 210-2 is known.

As described above, according to the embodiments of the present invention, the apparatus and method for detecting a radiation source are advantageous in that information about the distance to a radiation source can be rapidly obtained by using a simple construction including the position tracking unit and the movement means. Accordingly, the apparatus and method for detecting a radiation source according to the embodiments of the present invention are advantageous in that information about the distance to a radiation source can be accurately checked more rapidly by obtaining pieces of direction information about the radiation source at two or more points, while moving the position, by using only one radiation sensor and one collimator.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for determining a position of a radiation source comprising:
   a collimator configured to define an optical path from the radiation source;
   a radiation sensor provided at an end of the optical path and configured to measure an intensity of radiation incident on the optical path;
   a rotation driving unit connected to the collimator and configured to rotate the collimator;
   movement means configured to move the collimator and the rotation driving unit along a surface of land;
   a position tracking unit provided within the collimator and configured to track a current position and to measure a movement distance by the movement means; and
   a radiation position information processing unit configured to obtain direction information about a direction and distance to the radiation source based on a maximum intensity of radiation measured by the radiation sensor and the movement distance.

2. The apparatus as claimed in claim 1, wherein the radiation position information processing unit is configured to measure a longitude angle and a latitude angle to the radiation source based on the maximum intensity of radiation measured by the radiation sensor, and to measure the distance to the radiation source based on the longitude angle, the latitude angle, and the movement distance.

3. The apparatus as claimed in claim 1, wherein the rotation driving unit comprises pan and tilt means for panning and tilting the collimator.

4. The apparatus as claimed in claim 3, further comprising a rotation driving control unit for adjusting a panning angle, a tilting angle, and a speed of revolution by controlling the pan and tilt means.

5. The apparatus as claimed in claim 4, wherein the radiation position information processing unit is configured to measure a longitude angle to the radiation source based on the maximum intensity of radiation measured by the radiation sensor while the pan and tilt means pans the collimator, and to measure a latitude angle to the radiation source based on the maximum intensity of radiation measured by the radiation sensor while the pan and tilt means tilts the collimator.

6. The apparatus as claimed in claim 1, wherein the rotation driving unit comprises:
   a first rotation driving unit coupled to the collimator and configured to rotate the collimator around a first axis; and
   a second rotation driving unit configured to rotate the collimator and the first rotation driving unit around a second axis, but perpendicular to the first axis.

7. The apparatus as claimed in claim 6, further comprising a rotation driving control unit configured to adjust a speed of revolution of the first rotation driving unit and the second rotation driving unit.

8. The apparatus as claimed in claim 7, wherein the radiation position information processing unit is configured to measure a latitude angle to the radiation source based on the maximum intensity of radiation, measured by the radiation sensor, while the collimator is rotated, and a longitude angle to the radiation source based on the maximum intensity of radiation measured by the radiation sensor, while the collimator is rotated.

9. The apparatus as claimed in claim 1, wherein the position tracking unit is formed of a Global Positioning System (GPS) or a gyroscope and configured to measure the movement distance.

* * * * *